(12) United States Patent
Kuo et al.

(10) Patent No.: US 6,556,430 B2
(45) Date of Patent: Apr. 29, 2003

(54) PORTABLE ELECTRONIC DEVICE WITH A CONCEALABLE KEYBOARD MODULE

(75) Inventors: Ming-Chih Kuo, Taipei (TW); Ming-Hsun Chou, Taipei (TW)

(73) Assignee: Compal Electronics, Inc., Taipei (TW)

( * ) Notice: Subject to any disclaimer, the term of this patent is extended or adjusted under 35 U.S.C. 154(b) by 127 days.

(21) Appl. No.: 09/799,730

(22) Filed: Mar. 7, 2001

(65) Prior Publication Data

US 2002/0126441 A1 Sep. 12, 2002

(51) Int. Cl.[7] .................................................. G06F 1/16
(52) U.S. Cl. ...................... 361/680; 400/682; 400/489; 345/168; 16/285
(58) Field of Search ................................. 361/680, 681, 361/683; 364/708.1; 292/163, 181, 175, 177; 312/208.1, 223.2, 223.3, 319.1, 333; 400/82, 682, 691–693, 488–489, 715; 248/118.1, 118.3, 918, 631

(56) References Cited

U.S. PATENT DOCUMENTS

| | | | | |
|---|---|---|---|---|
| 4,159,153 A | * | 6/1979 | Yoshikawa | 292/DIG. 4 |
| 4,595,993 A | * | 6/1986 | Yao | 292/DIG. 4 |
| 5,241,303 A | * | 8/1993 | Register et al. | 178/18.03 |
| 5,287,245 A | * | 2/1994 | Lucente et al. | 292/163 |
| 5,318,367 A | * | 6/1994 | Braun et al. | 341/20 |
| 5,440,502 A | * | 8/1995 | Register | 364/708.1 |
| 5,594,619 A | * | 1/1997 | Miyagawa et al. | 361/681 |
| 5,612,691 A | * | 3/1997 | Murmann et al. | 341/22 |
| 6,195,839 B1 | * | 3/2001 | Patterson et al. | 16/328 |
| 6,282,082 B1 | * | 8/2001 | Armitage et al. | 312/223.2 |

* cited by examiner

*Primary Examiner*—Darren Schuberg
*Assistant Examiner*—Anthony Q. Edwards
(74) *Attorney, Agent, or Firm*—Pillsbury Winthrop LLP

(57) ABSTRACT

A portable electronic device, such as a portable computer, a personal digital assistant and a mobile telephone handset, includes a main board module having opposite first and second sides, and a keyboard module mounted on and coupled electrically to the main board module. The first side of the main board module is formed with an opening and a keyboard receiving cavity that extends from the opening toward the second side. The keyboard module is received in the keyboard receiving cavity and is capable of being pulled to extend out of the keyboard receiving cavity via the opening. As such, other control devices, such as a touch control panel and a pen input panel, can be provided on a third side of the main board module that interconnects the first and second sides.

9 Claims, 3 Drawing Sheets

PORTABLE ELECTRONIC DEVICE WITH A CONCEALABLE KEYBOARD MODULE

BACKGROUND OF THE INVENTION

1. Field of the Invention

The invention relates to a portable electronic device, more particularly to a portable electronic device with a concealable keyboard module.

2. Description of the Related Art

Referring to FIG. 1, a conventional notebook computer 100 is shown to comprise a main board module 13 and a display module 11 coupled pivotally to the main board module 13. The display module 11 has one side that is disposed to confront the main board module 13 and that is provided with a liquid crystal display panel 15. The main board module 13 has a top side that is disposed to confront the display panel 15 and that is provided with a keyboard module 17 and a touch control module 18. The main board module 13 further has a bottom side 19 opposite to the top side and adapted to be disposed on a worktable.

In the conventional notebook computer 100, because the keyboard module 17 and the touch control module 18 are present on the top side of the main board module 13, it is not possible to install other control devices thereon. As such, the conventional notebook computer 100 is generally provided with a wide variety of connectors (not shown) to permit external connection of other control devices.

It is noted that the aforesaid drawback of the conventional notebook computer 100 is also present in conventional personal digital assistants (PDA) and conventional mobile telephone handsets.

SUMMARY OF THE INVENTION

Therefore, the main object of the present invention is to provide a portable electronic device with a concealable keyboard module, thereby resulting in extra surface space that can be to mount other control devices thereon.

According to the present invention, a portable electronic device, such as a portable computer, a personal digital assistant and a mobile telephone handset, includes a main board module having opposite first and second sides, and a keyboard module mounted on and coupled electrically to the main board module. The first side of the main board module is formed with an opening and a keyboard receiving cavity that extends from the opening toward the second side. The keyboard module is received in the keyboard receiving cavity and is capable of being pulled to extend out of the keyboard receiving cavity via the opening. As such, other control devices, such as a touch control panel and a pen input panel, can be provided on a third side of the main board module that interconnects the first and second sides.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
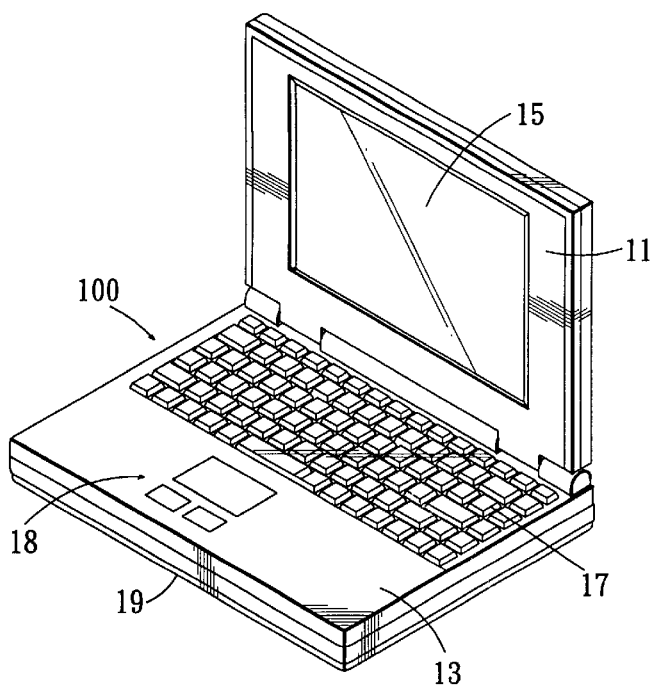
FIG. 1 is a perspective view of a conventional notebook computer.
Figure 2:
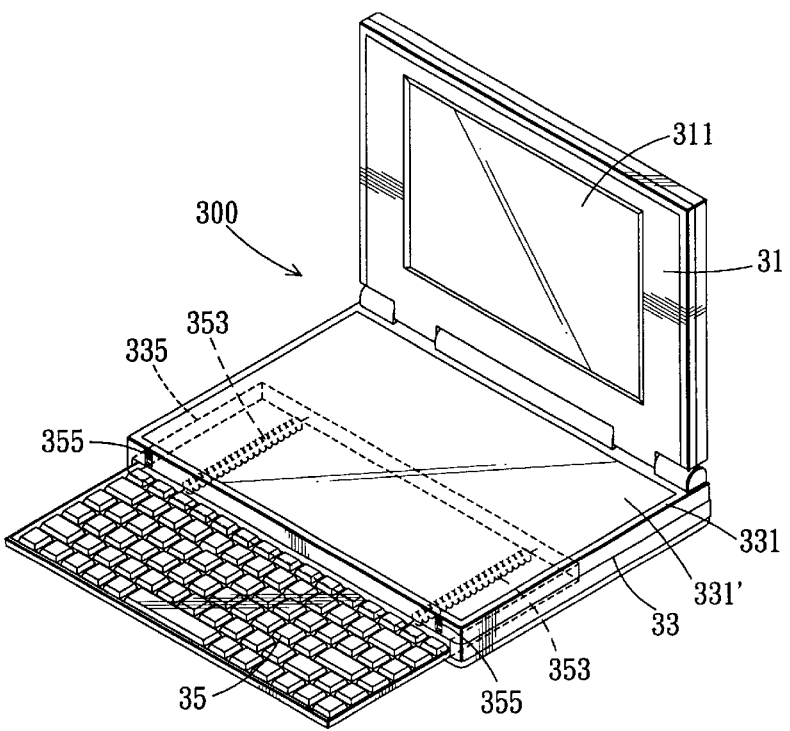
FIG. 2 is a perspective view of the first preferred embodiment of a portable electronic device according to the present invention.
Figure 3:
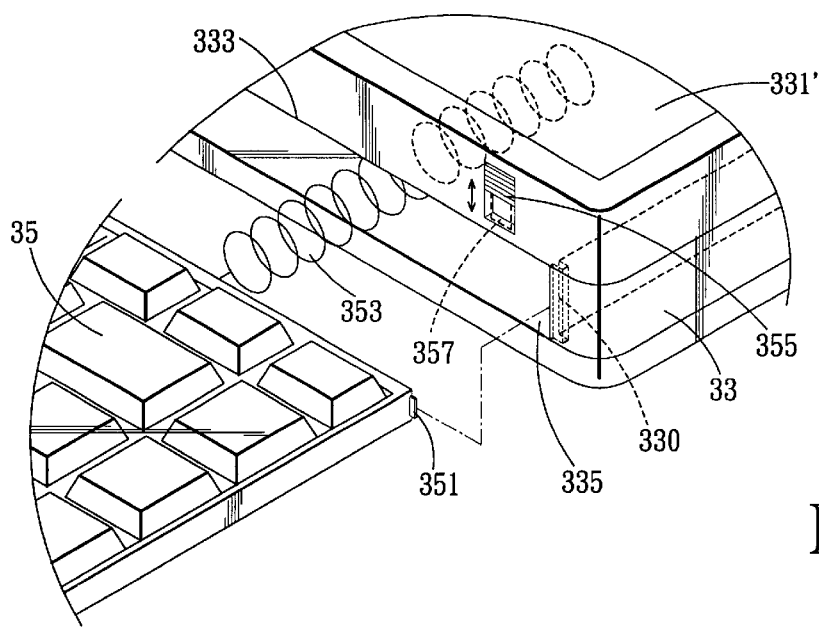
FIG. 3 is a fragmentary perspective view of the first preferred embodiment.

Referring to FIGS. 2 and 3, the first preferred embodiment of a portable electronic device according to the present invention is shown to be embodied in a notebook computer 300 that includes a display module 31, a main board module 33, and a keyboard module 35. The display module 31 is coupled pivotally to the main board module 33 adjacent to a rear side of the latter in a conventional manner, and is provided with a liquid crystal display panel 311. The main board module 33 has a top side 331 that is disposed to confront the display panel 311, and a front side that is opposite to the rear side and that is formed with an opening 333 and a keyboard receiving cavity 335 extending from the opening 333 toward the rear side of the main board module 33. The keyboard module 35 is mounted on and is coupled electrically to the main board module 33. The keyboard module 35 is received in the keyboard receiving cavity 335 and can be pulled to extend out of the same via the opening 333. In this embodiment, the keyboard receiving cavity 335 is configured to fully conceal the keyboard module 35. The keyboard module 35 has a rear end part formed with a pair of lateral tabs 351 that slidably engage the interior of the keyboard receiving cavity 335 and that abut against end flanges 330 at the opening 333 so as to prevent removal of the keyboard module 35 from the keyboard receiving cavity 335. As to how the keyboard module 35 is slidably disposed in the keyboard receiving cavity 335, this can be easily accomplished by those skilled in the art and will not be detailed herein for the sake of brevity. Preferably, a pair of coil springs 353 interconnect the rear end part of the keyboard module 35 and an innermost end wall of the keyboard receiving cavity 335 to aid smooth extension and retraction of the keyboard module 35 from and into the keyboard receiving cavity 335.

A pair of movable stop members 355 are mounted movably on the main board module 33 adjacent to the opening 333. When the keyboard module 35 is disposed entirely in the keyboard receiving cavity 335, the stop members 355 can be operated such that a downward stud 357 on each of the stop members 355 abuts against a front end part of the keyboard module 35, thereby blocking selectively movement of the keyboard module 35 out of the keyboard receiving cavity 335 via the opening 333. It should be apparent to those skilled in the art that there are many alternative mechanisms available for arresting undesired movement of the keyboard module 35 out of the keyboard receiving cavity 335.

Because the keyboard module 35 is not provided on the top side 331 of the main board module 33, there is available space for mounting other control devices 331', such as a touch control panel or a pen input panel, on the main board module 33 to enhance functionality of the notebook computer 300.

Figure 4:
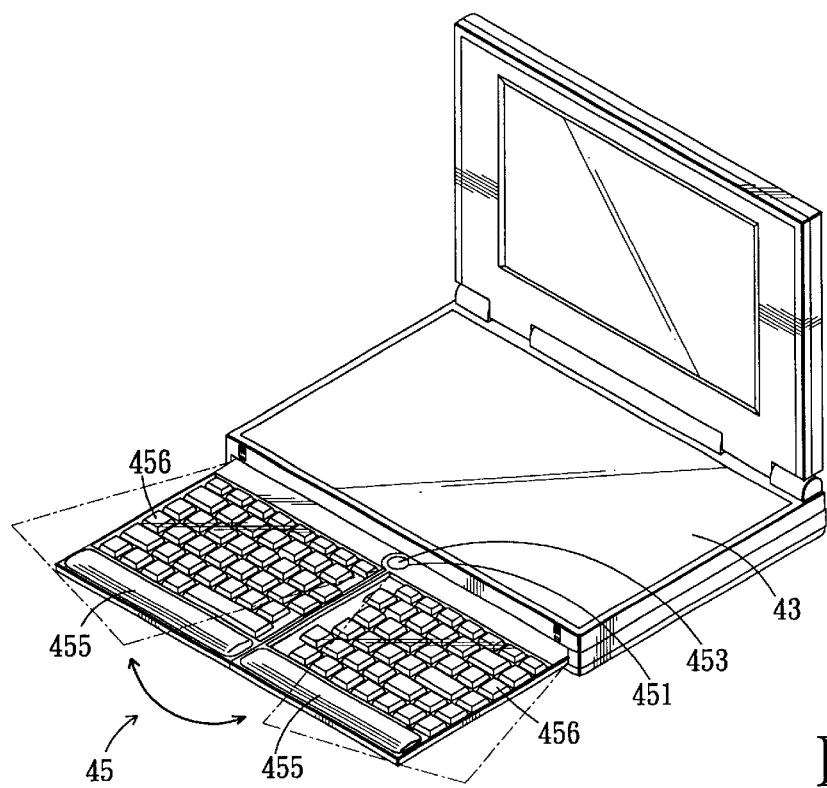
FIG. 4 is a perspective view of the second preferred embodiment of a portable electronic device according to the present invention.
Figure 5:
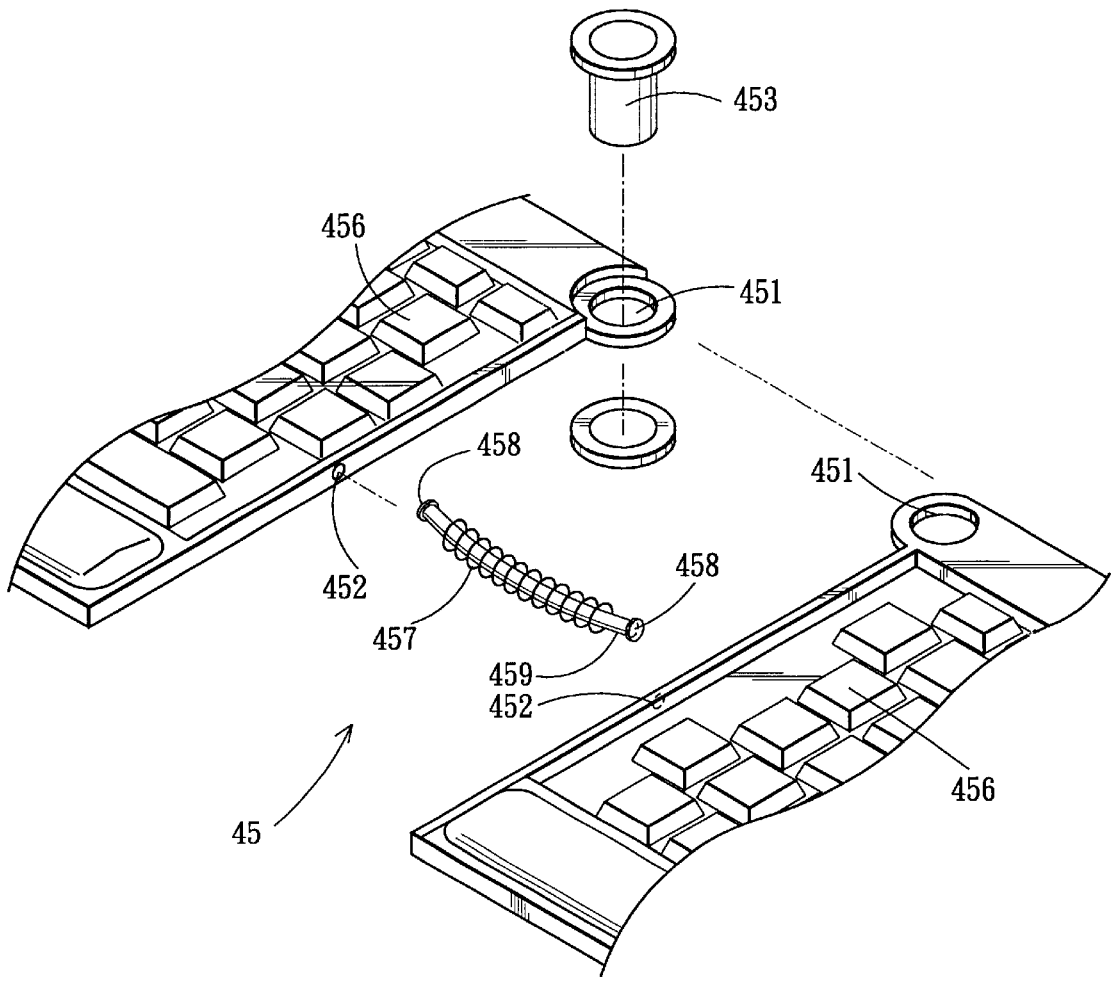
FIG. 5 is a fragmentary perspective view of the second preferred embodiment.

FIGS. 4 and 5 illustrate the second preferred embodiment of a portable electronic device according to the present invention. Unlike the first preferred embodiment, the keyboard module 45 is shown to include left and right keyboard parts 456 having adjacent rear inner corner portions that are coupled pivotally to each other about a pivot axis. More particularly, the rear inner corner portion of each of the keyboard parts 456 is formed with a hole-defining lug. The lugs of the keyboard parts 456 are superimposed one upon the other and define axially aligned fastener holes 451. A pivot fastener 453 extends through the fastener holes 451 to couple pivotally the keyboard parts 456. The keyboard parts 456 can thus pivot away from each other at an angle when the keyboard module 45 is moved out of the keyboard receiving cavity in the main board module 43. For enhanced comfort when using the keyboard module 45, each of the keyboard parts 456 has a distal front end portion provided with a hand-supporting cushion 455 thereon for supporting the hands of the user.

In this embodiment, a coil spring 457 is disposed between confronting lateral sides of the keyboard parts 456. The spring 457 is sleeved on a curved support rod 459 having opposite enlarged ends 458 that are mounted respectively on the confronting lateral sides of the keyboard parts 456 and that extend respectively into the keyboard parts 456 via mounting holes 452 in the latter. The spring 457 acts to push the keyboard parts 456 to pivot away from each other when the keyboard module 45 is moved out of the keyboard receiving cavity of the main board module 43. The support rod 459 guides expanding and contracting actions of the spring 457.

It should be apparent to those skilled in the art that the concealed keyboard module arrangement of the portable electronic device of this invention can also be applied to the keypad of a mobile telephone handset or a personal digital assistant.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A portable electronic device, comprising:
    a main board module having opposite first and second sides, said first side being formed with an opening and a keyboard receiving cavity that extends from said opening toward said second side, said first and second sides being front and rear sides of said main board module;
    a keyboard module mounted on and coupled electrically to said main board module, said keyboard module being received in said keyboard receiving cavity and being capable of being pulled to extend out of said keyboard receiving cavity via said opening, said keyboard module including left and right keyboard parts having adjacent rear inner corner portions that are coupled pivotally to each other about a pivot axis, said keyboard parts further having confronting lateral sides, said keyboard module further including a coil spring disposed between said confronting lateral sides of said keyboard parts for pushing said keyboard parts to pivot away from each other when said keyboard module is moved out of said keyboard receiving cavity via said opening, said keyboard module further including a curved support rod having said coil spring sleeved thereon, said support rod having opposite ends mounted respectively on said confronting lateral sides and extending respectively into said keyboard parts; and
    a display module coupled pivotally to said main board module adjacent to said rear side.

2. The portable electronic device of claim 1, wherein said display module includes a liquid crystal display panel.

3. The portable electronic device of claim 1, wherein said keyboard module is formed with a pair of tabs that slidably engage an interior of said keyboard receiving cavity, said opening being formed with a pair of end flanges that abut respectively against said tabs so as to prevent removal of said keyboard module from said keyboard receiving cavity.

4. The portable electronic device of claim 1, wherein said keyboard receiving cavity has an innermost end wall, said portable electronic device further comprising at least one coil spring interconnecting said keyboard module and said end wall of said keyboard receiving cavity.

5. The portable electronic device of claim 1, further comprising at least one stop member mounted movably on said main board module and operable so as to block selectively movement of said keyboard module out of said keyboard receiving cavity via said opening.

6. The portable electronic device of claim 1, wherein said main board module further has a third side that interconnects said first and second sides and that is provided with a touch control panel.

7. The portable electronic device of claim 1, wherein said main board module further has a third side that interconnects said first and second sides and that is provided with a pen input panel.

8. The portable electronic device of claim 1, wherein said rear inner corner portion of each of said keyboard parts is formed with a hole-defining lug, said lugs of said keyboard parts being superimposed one upon the other and defining axially aligned fastener holes, said keyboard module further including a pivot fastener that extends through said fastener holes and that couples pivotally said keyboard parts.

9. The portable electronic device of claim 1, wherein said keyboard module has a distal end portion provided with a hand-supporting cushion thereon.

* * * * *